(12) United States Patent
Ganapathy

(10) Patent No.: US 9,189,205 B2
(45) Date of Patent: Nov. 17, 2015

(54) PRESCRIBING A SOFTWARE ARCHITECTURE FOR IMPLEMENTING SERVICE INTEGRATION

(71) Applicant: International Business Machines Corporation, Armonk, NY (US)

(72) Inventor: Vishwanath Ganapathy, Marietta, GA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/522,773

(22) Filed: Oct. 24, 2014

(65) Prior Publication Data

US 2015/0046899 A1   Feb. 12, 2015

Related U.S. Application Data

(63) Continuation of application No. 13/609,333, filed on Sep. 11, 2012, now Pat. No. 8,914,772, which is a continuation of application No. 11/935,679, filed on Nov. 6, 2007, now Pat. No. 8,316,346.

(51) Int. Cl.
*G06F 9/44* (2006.01)
*G06Q 10/06* (2012.01)
*G06Q 30/02* (2012.01)

(52) U.S. Cl.
CPC .. *G06F 8/20* (2013.01); *G06F 8/35* (2013.01); *G06Q 10/06* (2013.01); *G06Q 30/02* (2013.01)

(58) Field of Classification Search
None
See application file for complete search history.

(56) References Cited

U.S. PATENT DOCUMENTS 8,316,346 B2 * 11/2012 Ganapathy .................... 717/104
8,914,772 B2 * 12/2014 Ganapathy .................... 717/109

* cited by examiner

*Primary Examiner* — Chuck Kendall
(74) *Attorney, Agent, or Firm* — Schmeiser, Olsen & Watts; John R. Pivnichny

(57) ABSTRACT

An approach is provided for prescribing a software architecture to implement service integration. To determine first and second products, a first weight of a first software architecture is multiplied by weights of first requirements of a service and a second weight of a second software architecture is multiplied by weights of second requirements of the service. The first and second requirements are satisfied, respectively, by first and second sets of responses respectively associated with the first and second software architectures. A first summation of the first products is determined to be greater than a second summation of the second products. Based on the first summation being greater than the second summation, the first software architecture instead of the second software architecture is prescribed to realize the service in a service integration implementation. A work effort required to utilize the first software architecture to realize the service is estimated.

20 Claims, 11 Drawing Sheets

| | 602 | 603 | 604 | 605 | 606 |
|---|---|---|---|---|---|
| ID | Criteria | Question | Consideration(s) | Criteria Weight |
| FR01 | Frequency | How frequently will this service be accessed? | Some services are not frequently accessed since their function or information does not change very often or is needed only occasionally (e.g., sales forecast) | 5% |
| FR02 | Event-Driven | How event driven or event-aware should this service be? | Event-driven means that the service needs to immediately react to a business event | 3% |
| FR03 | Near Real-Time | Should this service accommodate near real-time processing? | Near real-time means that the service should immediately process its function. Chances are there are other processes blocking (waiting) on this service to complete | 5% |
| FR04 | UI Dependency | Does this service directly affect the response time of a UI that may be blocking on the request? | Services that directly affect a UI that is blocking on the request need special attention to request/response times | 5% |
| FR05 | Transactionality | Does the service require transactional support including single, two-phased or federated/XA | This may include one or two-phased (XA) support for transactions | 5% |

FIG. 6A

| ID (602) | Criteria (603) | 1 SOAP/HTTP (611) | 2 JMS/Broker (612) | 3 ETL (613) | 4 FTP (614) | 5 RMI/IIOP (615) | 6 Socket (616) | Response & Recommendation (617) |
|---|---|---|---|---|---|---|---|---|
| FR01 | Frequency | Several times a minute or second | Several times an hour or minute | Multiple times a day and batch | Nightly, weekly, in batch, occasionally | Several times a minute or second | Several times a minute or second | 2 JMS/Broker |
| FR02 | Event-Driven | React to an event based on a specific request in a "pull" model | React to an event via a message queue in a "push" model | React to event based on a DB trigger or polling process | Not event aware | React to event based on a J2EE message or alerts in a pull or push model | React to event in milliseconds via a "pull" model | 2 JMS/Broker |
| FR03 | Near Real-Time | Processing per request is in seconds | Varying processing time. The information/request should remain until processed | Processing in several minutes, hours based on a DB | Processing in several minutes, hours, based on flat file | Processing is in sub-seconds | Milliseconds processing time, in conversational mode | 2 JMS/Broker |
| FR04 | UI Dependency | Not connected or related to a UI | Displayed. Need to refresh periodically | UI is asynchronously blocking on result | UI is synchronously blocking on result | UI needs information ASAP | 0 | 2 JMS/Broker |
| FR05 | Transactionality | No transaction or compensation | Transactions to sync with DB and possibly XA transactions | DB transactions only | No transaction or compensation | Full XA transaction capabilities | No transaction or compensation | 1 SOAP/HTTP |

FIG. 6B

| ID 622 | Criteria 623 | Question 624 | Consideration(s) 625 | Criteria Weight 626 |
|---|---|---|---|---|
| NFR01 | Payload Size | What is the transaction payload size? | The size of each payload has an impact on the technology used. Some payloads need to accommodate multiple transactions while others can be on an individual transaction level. | 5% |
| NFR02 | Volume | What kind of volumes need to be supported? | The volume of the interface can be simply measured as V = Fq x Ps, where Fq = Frequency and Ps = Payload size. The volume rating (low, medium, high, very high) are relative. | 10% |
| NFR03 | Network Latency & Dependency | Are there any network latency and dependency issues to consider? | | 3% |
| NFR04 | Performance | What are the performance requirements? Are there any service request & processing latency issues to consider? | | 10% |
| NFR05 | Availability | Does this service have high availability requirements based on the service consumer's requirements? | | 3% |

| ID | Criteria | 1 SOAP/HTTP | 2 JMS/Broker | 3 ETL | 4 FTP | 5 RMI/IIOP | 6 Socket | Response & Recommendation |
|---|---|---|---|---|---|---|---|---|
| NFR01 | Payload Size | Small payload packets. Limit to 1-2 KB/rqs | Large payload capability. Optimized for 2-4 K. Practical upper limit is several MB/rqs | Reasonably large payload capability | Very large payload capability. Several MBs to GBs in size. | Small payload, typically represented as a Java object | Very small payload size. Typically < 1 KB in size. | 2 JMS/Broker |
| NFR02 | Volume | Low/Medium volume | Medium to High volume | High to Very High volume | High to Very High volume | Low/Medium volume | Low/Medium volume | NONE |
| NFR03 | Network Latency & Dependency | Yes. Fully dependent on network for each request/response transaction | Somewhat. Local queue managers can be asynchronously updated | Somewhat. Access to DB is required; however, local/staging tables can alleviate dependency | More network dependent. During ftp transfer, network needs to be up. Since there is no restart ability, large files are more prone to errors with no restart ability | Yes. Fully dependent on network for each request/response transaction | Yes. Fully dependent on network for each request/response transaction | 2 JMS/Broker |
| NFR04 | Performance | Performance rating is good | Performance rating is very good | Performance rating is good | Performance rating is poor due to dealing with payload in its entirety (full file with no restart ability) | Performance is excellent | | NONE |
| NFR05 | Availability | Capability for HA with clustering of app. functions | Message queues can be clustered for HA. Still dependent on app. | DB can be clustered for HA | Fully dependent on app. No clustering ability for HA | J2EE app can be clustered for HA | | 1 SOAP/HTTP |

| Prescribed Technology | | | SOAP/HTTP | | | |
|---|---|---|---|---|---|---|
| Responses by Criteria | 34% | 43% | 0% | 0% | 0% | 0% |
| Accumulated Weighted Response Values | 14% | 13% | 0% | 0% | 0% | 0% |
| Technology Adoption Preference [Y/N] | Y | Y | Y | N | Y | N |
| Technology Preference Relative Weight | 40% | 30% | 25% | 0% | 5% | 0% |
| | 1 | 2 | 3 | 4 | 5 | 6 |
| | SOAP/HTTP | JMS/Broker | ETL | FTP | RMI/IIOP | Socket |

PRESCRIBING A SOFTWARE ARCHITECTURE FOR IMPLEMENTING SERVICE INTEGRATION

This application is a continuation application claiming priority to Ser. No. 13/609,333 filed Sep. 11, 2012 which is a continuation application claiming priority to Ser. No. 11/935,679 filed Nov. 6, 2007, now U.S. Pat. No. 8,316,346 issued Nov. 20, 2012.

FIELD OF THE INVENTION

The present invention relates to a computer-implemented method and system for selecting a software architecture to implement service integration, and more particularly to a technique for prescribing a data exchange protocol to implement service-oriented integration based on selected characteristics of functional and non-functional requirements.

BACKGROUND OF THE INVENTION

Conventionally, selections of software architecture to implement the integration of services in a computing system are subjective and based on the personal experience of each individual making software architecture recommendations. These individual experience-driven recommendations lead to inconsistent, unreliable, non-scalable software architecture recommendations that are indefensible to clients who request the integrated services. Because of the inconsistent nature of the aforementioned recommendations, selecting certain recommended software architectures results in unnecessarily expensive implementations of service integration. Thus, there exists a need to overcome at least one of the preceding deficiencies and limitations of the related art.

SUMMARY OF THE INVENTION

The present invention provides a computer-implemented method of selecting a technology to implement an integration of a plurality of services, comprising:

receiving, by a computing system, a set of requirements for a service of the plurality of services, wherein the set of requirements includes a plurality of functional requirements and a plurality of non-functional requirements;

receiving, by the computing system, a plurality of technology preference relative weights for relatively weighting a plurality of technologies;

receiving, by the computing system, a plurality of requirement relative weights for relatively weighting the set of requirements;

receiving, by the computing system, a plurality of responses, wherein the responses are associated with the requirements and with the requirement relative weights in a one-to-one correspondence, wherein the responses are associated with the technology preference relative weights and with indicators of a set of indicators in a many-to-one correspondence, wherein the set of n indicators indicates the plurality of technologies, and wherein the plurality of responses indicates a plurality of characteristics that satisfy the set of requirements; and selecting, by the computing system, a technology of the plurality of technologies to implement the integration of the plurality of services, wherein the selecting the technology is based on the plurality of technology preference relative weights and the plurality of requirement relative weights.

A system, computer program product, and a process for supporting computing infrastructure that provides at least one support service corresponding to the above-summarized method are also described and claimed herein.

Advantageously, the present invention provides a systematic, rational, and defensible technique for selecting a technology to implement service integration. Further, the present invention optimizes the design time related to building a service by significantly decreasing subjectivity in selecting the technology to be used for service integration.

BRIEF DESCRIPTION OF THE DRAWINGS

FIG. 6A depicts a report excerpt that includes a first set of functional requirement information associated with an exemplary service integration resulting from the process of FIG. 2, in accordance with embodiments of the present invention.

FIG. 6B depicts a report excerpt that includes a second set of functional requirement information associated with an exemplary service integration resulting from the process of FIG. 2, in accordance with embodiments of the present invention.

FIG. 6C depicts a report excerpt that includes a first set of non-functional requirement information associated with an exemplary service integration resulting from the process of FIG. 2, in accordance with embodiments of the present invention.

FIG. 6D depicts a report excerpt that includes a second set of functional requirement information associated with an exemplary service integration resulting from the process of FIG. 2, in accordance with embodiments of the present invention.

FIG. 6E depicts a report excerpt that includes calibration data received in the process of FIG. 3, accumulated weighted response values determined in the process of FIG. 4, and a technology prescribed in the process of FIG. 4, in accordance with embodiments of the present invention.

DETAILED DESCRIPTION OF THE INVENTION

Overview

The present invention provides a technique that employs weighted metrics together with a simplified integration architecture of functional requirements and non-functional requirements to provide a precise and defensible prescription of a technology for implementing service integration. The weighted metrics are employed in a technology selection algorithm that weights responses that select characteristics associated with the functional and non-functional requirements. The weighting performed by the technology selection algorithm utilizes a first set of weights applied to the requirements and a second set of weights applied to each potential technology choice.

Service Integration Realization System

Figure 1:
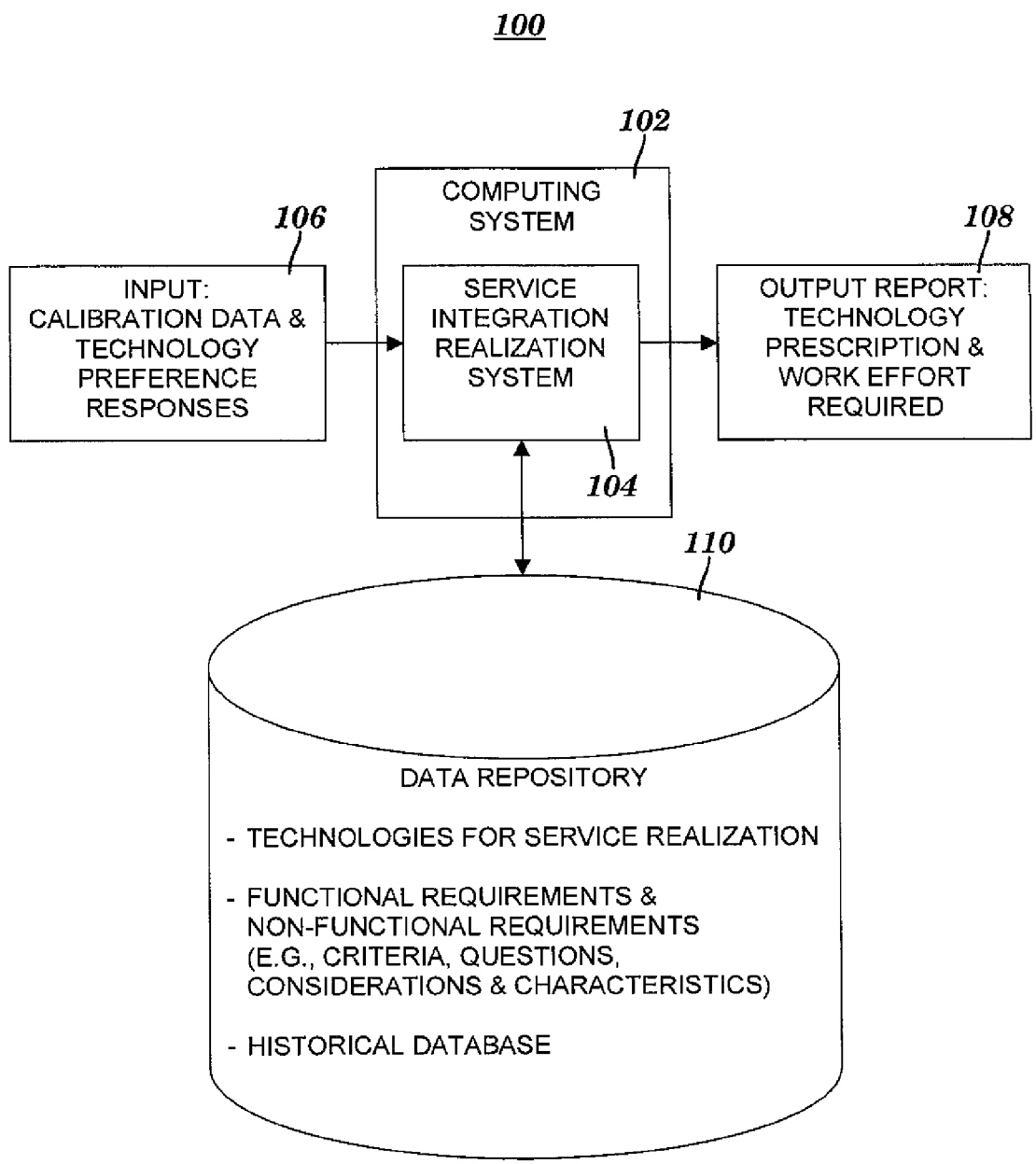
FIG. 1 is a block diagram of a system for selecting a computing technology for implementing service integration, in accordance with embodiments of the present invention.

FIG. 1 is a block diagram of a system for selecting a computing technology for implementing service integration, in accordance with embodiments of the present invention. System 100 includes a computing system 102 that includes a service integration realization system 104. System 104 implements a service integration realization process for selecting a software architecture (a.k.a. technology or computing technology) to realize (i.e., build or develop) a service within an implementation of a service-oriented integration (e.g., an integration of services across multiple computer applications). System 100 also includes input 106 that is received by service integration realization system 104, an output report 108 that is generated by system 104, and a data repository 110 that is utilized by system 104 to generate output report 108.

As used herein, a service is defined as a business software component having functionality that has the following properties: (1) publicly available; (2) networked; (3) has a well-defined contract; (4) stateless; and (5) loosely bound. The aforementioned networked property indicates that the service can be invoked (i.e., requested) from remote computing systems. The aforementioned well-defined contract includes a description of (i) how the service is invoked by a requester in an invocation, (ii) the parameters required in the invocation, and (iii) the results of the invocation. The aforementioned stateless property indicates that the service does not remember the last time a computing entity invokes the service. Further, a request for the service is followed by a response. The aforementioned loosely bound property indicates that the service does not require knowledge of the identity or location of the requester that is invoking the service.

Services are invoked through data exchange protocols (i.e., communication protocols) that provide location transparency and interoperability. A data exchange protocol is provided by a software interface (hereinafter, referred to as an interface). Although the novel system and method disclosed herein describe the prescription of a technology for realizing a service, the present invention also contemplates an analogous system and method for prescribing a technology for realizing an interface that provides the data exchange protocol by which the services are invoked.

As used herein, service integration (a.k.a. service-oriented integration) is defined as a combination of computing entities (e.g., computing systems and/or software applications) that uses services to enable interaction of data and processing between the computing entities. As used herein, service integration realization is defined as the development of a service integration.

In one embodiment, service integration realization system 104 is implemented by a custom software application. In another embodiment, service integration realization system 104 is implemented by a spreadsheet software tool.

Input 106 includes (1) calibration data that calibrates the service integration realization process implemented by system 104 with technology adoption preferences and relative weights of technology preferences and functional and non-functional requirements of the service being realized and (2) technology preference responses (a.k.a. responses) from one or more users of computing system 102, where each response indicates a characteristic that meets a requirement of the service being realized.

Data repository 110 includes the following data: (1) a pre-defined list of technologies (i.e., technology preferences) available to facilitate the realization of the service; (2) functional requirements (i.e., functional criteria) of the service being realized and information (a.k.a. functional requirement information) related thereto; (3) non-functional requirements (i.e., non-functional criteria) of the service being realized and information (a.k.a. non-functional requirement information) related thereto; and (4) historical data. For each functional requirement and non-functional requirement, the related information includes an identifier, a criteria name, a question whose response indicates a characteristic of one of the listed technologies, one or more considerations that are taken into account in the formulation of an answer to the question, and characteristics of the functional/non-functional requirement where each characteristic indicates one of the listed technologies.

The historical data included in data repository 110 is used to generate and update the characteristics and each characteristic's association with a technology.

In an alternate embodiment, the aforementioned data in data repository 110 is included in multiple data repositories (not shown).

Output report 108 includes the technology prescribed by service integration realization system 104 to realize the service. In one embodiment, output report 108 also includes an estimation of the work effort required to realize the service. Output report 108 is provided on, for example, a display screen (not shown) that is coupled to computing system 102.

Service Integration Realization Process

Figure 2:
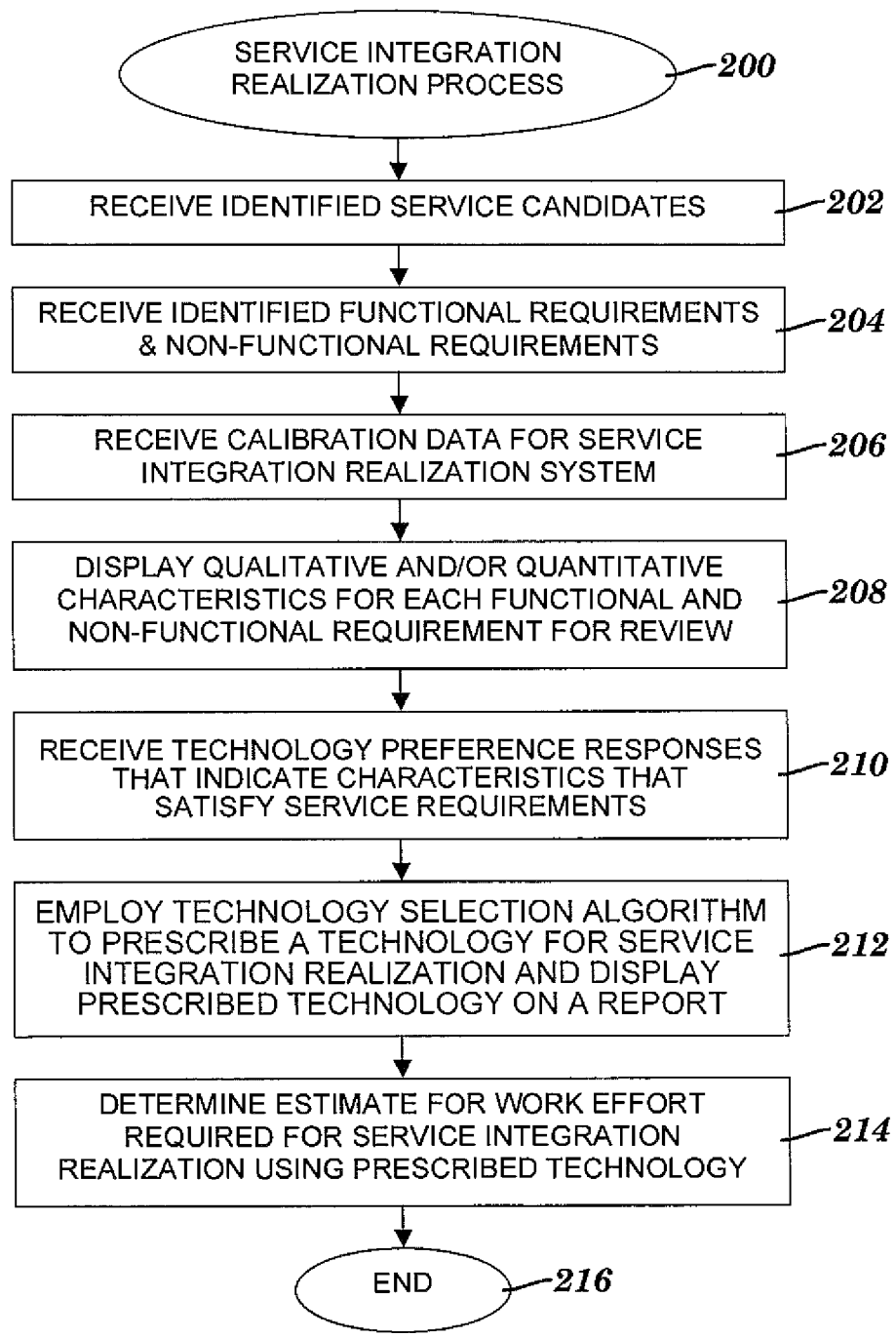
FIG. 2 is a flow diagram of a service integration realization process implemented by a service integration realization system included in the system of FIG. 1, in accordance with embodiments of the present invention.

FIG. 2 is a flow diagram of a service integration realization process implemented by a service integration realization system included in the system of FIG. 1, in accordance with embodiments of the present invention. The service integration realization process begins at step 200. Prior to step 202, one or more users of system 100 (see FIG. 1) identify service candidates. The service candidates are the services needed to be realized in a service integration in order to exchange data between software applications, exchange data between computing systems, and/or to exchange data between an application and a computing system. In step 202, service integration realization system 104 (see FIG. 1) receives the identified service candidates including a service that is to be realized via a technology to be prescribed by the subsequent steps of the process of FIG. 2. Hereinafter, the service to be realized by the technology prescribed by the process of FIG. 2 is simply referred to as "the service" or "the service being realized."

Prior to step 204, one or more users of system 100 (see FIG. 1) review a pre-defined list of functional requirements that are pre-determined to be associated with services and a pre-defined list of non-functional requirements that are pre-determined to be associated with services. Furthermore, from the reviewed list of functional requirements, the one or more users identify a plurality of functional requirements (a.k.a. the identified functional requirements) that apply to the service being realized. Moreover, from the reviewed list of non-functional requirements, the one or more users identify a plurality of non-functional requirements (a.k.a. the identified non-functional requirements) that apply to the service being realized. Hereinafter, the identified functional requirements and the identified non-functional requirements are also collectively referred to as the service requirements.

As used herein, a functional requirement is defined as a specification of an intended behavior of a service or a function that the service must be capable of performing, where the behavior or function supports user goals, tasks or activities.

As used herein, a non-functional requirement (a.k.a. quality of service requirement or technical requirement) is defined as a constraint on attributes of a service's behavior or function. A non-functional requirement specifies criteria that can be used to judge the operation of the service, such as performance, availability, payload size, network latency, and volume.

In step 204, service integration realization system 104 (see FIG. 1) receives the identified functional requirements and the identified non-functional requirements.

In step 206, one or more users of system 100 (see FIG. 1) input calibration data into service integration realization system 104 (see FIG. 1). The calibration data includes technology adoption preferences, technology preference relative weights and relative weights for the functional and non-functional requirements received in step 204. The calibration data is described in more detail below relative to FIG. 3. Furthermore, in step 206, service integration realization system 104 (see FIG. 1) receives the input calibration data.

In step 208, service integration realization system 104 (see FIG. 1) displays to one or more users of system 100 (see FIG. 1) a set of N qualitative and/or quantitative characteristics for each of the identified functional requirements and for each of the identified non-functional requirements, where N is the number of different technologies that are included in the pre-defined list of technologies stored in data repository 110 (see FIG. 1). The pre-defined list of technologies includes the technologies that may be prescribed by the process of FIG. 2. In one embodiment, the sets of characteristics are displayed in step 208 on a display screen (not shown in FIG. 1) coupled to computing system 102 (see FIG. 1) or coupled to another computing unit or device (not shown in FIG. 1). In another embodiment, the sets of characteristics are displayed to the one or more users in step 208 on a printed, hard copy report.

The aforementioned characteristics are displayed in step 208 to facilitate a review of each set of N characteristics by one or more users of system 100 (see FIG. 1). The aforementioned review of each of the sets of N characteristics determines which characteristic in the reviewed set meets (i.e., satisfies) one or more pre-defined criteria associated with the identified functional or non-functional requirement that is associated with the reviewed set of characteristics. In step 208, the one or more users provide (e.g., enter or select) in input 106 (see FIG. 1) technology preference responses that indicate the characteristics that are determined to satisfy the one or more pre-defined criteria associated with the functional and non-functional requirements received in step 204. Hereinafter, the technology preference responses provided in step 208 are also referred to simply as responses. The responses provided in step 208 are included in a pre-defined set of technology preference responses that are associated, in a one-to-one correspondence, with the technologies included in the pre-defined list of technologies stored in data repository 110 (see FIG. 1).

In one embodiment, step 208 displays the characteristics in each set along with corresponding indicators of the characteristics. In one embodiment, the indicators of the characteristics are numerals. For example, each set includes six characteristics and for each set, the service integration realization system 104 (see FIG. 1) displays the six characteristics in the set along with six corresponding numerals (e.g., the numerals 1 through 6). In step 208 in this example, a user reviews a set of characteristics and determines the characteristic in the set of characteristics that satisfies the criterion associated with a functional requirement or non-functional requirement and provides the numeral corresponding to the determined characteristic.

In step 210, service integration realization system 104 (see FIG. 1) receives technology preference responses provided in step 208. Each of the received technology preference responses indicates a characteristic that satisfies the criterion associated with a functional requirement or non-functional requirement (i.e., satisfies a service requirement).

In step 212, service integration realization system 104 (see FIG. 1) employs a service integration realization algorithm (see FIG. 4) to generate a prescription of a technology to realize the service and to display the prescribed technology in report 108 (see FIG. 1) presented to one or more users of system 100 (see FIG. 1). In one embodiment, step 212 displays the prescribed technology in a report presented on a display screen coupled to computing system 102 (see FIG. 1) or coupled to another computing unit or device (not shown in FIG. 1). In another embodiment, the prescribed technology is displayed to the one or more users in step 212 on a printed, hard copy report.

In step 214, service integration realization system 104 (see FIG. 1) determines an estimate for a work effort required to realize the service via the prescribed technology and the service integration realization process of FIG. 2 ends at step 216. The estimate determined in step 214 is displayed, for example, in the report that includes the prescribed technology.

In one embodiment, step 214 includes the following sub-steps: (1) determining a complexity rating of the service based on complexity factors; (2) generating a bottom-up raw estimate for building the service; (3) generating a bottom-up estimate of work effort based on the complexity rating and the technology prescribed in step 212; (4) identifying resources, roles and deliverables for a development of a Full Time Equivalent (FTE) model based on a timeline for implementation of the service integration; (5) developing a time-phased top-down FTE model for the service integration that generates a top-down estimate of the work effort; and (6) reconciling the bottom-up estimate and the top-down estimate to generate a final estimate of the work effort.

Figure 3:
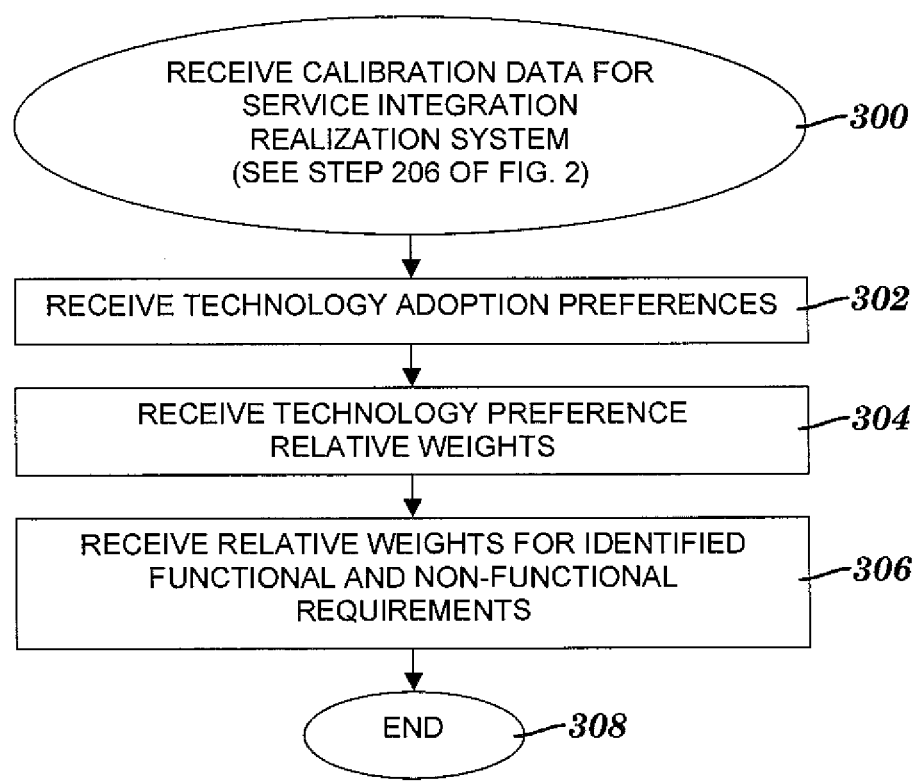
FIG. 3 is a flow diagram of a calibration process included in the process of FIG. 2, in accordance with embodiments of the present invention.

FIG. 3 is a flow diagram of a calibration process included in the process of FIG. 2, in accordance with embodiments of the present invention. The calibration process in which service integration realization system 104 (see FIG. 1) receives calibration data begins at step 300 and is included in step 206 of FIG. 2. As used herein, calibration data includes technology adoption preferences, technology preference relative weights, and relative weights for functional and non-functional requirements.

Prior to step 302, one or more users of system 100 (see FIG. 1) provide (e.g., enter or select) indicators in input 106 (see FIG. 1) to indicate which of the technologies in the pre-defined list of technologies may be considered for realizing the service (i.e., are technology adoption preferences) and to indicate which of the technologies may not be considered for realizing the service (i.e., are not technology adoption preferences). For example, the one or more users enter Y to indicate that a corresponding technology is a technology adoption preference and enter N to indicate that a corresponding technology is not a technology adoption preference.

In step 302, service integration realization system 104 (see FIG. 1) receives the technology adoption preferences that are provided by the one or more users and that are included in input 106 (see FIG. 1).

Prior to step 304, the one or more users of system 100 (see FIG. 1) provide (e.g., enter or select) values (e.g., percentages) that are technology preference relative weights included in input 106 (see FIG. 1). The technology preference relative weights are associated, in a one-to-one correspondence, with the technologies included in the pre-defined list of technologies. Each technology preference relative weight indicates a relative preference for using the associated technology to realize the service, where the associated technology is the technology associated with the technology preference relative weight. The provided technology preference relative weights add up to 100%.

In step 304, service integration realization system 104 (see FIG. 1) receives the technology preference relative weights that are provided by the one or more users and that are included in input 106 (see FIG. 1).

Prior to step 306, the one or more users of system 100 (see FIG. 1) provide (e.g., enter or select) values (e.g., percentages) that are relative weights of the functional requirements and non-functional requirements, which were identified by one or more users of system 100 (see FIG. 1) prior to step 204 (see FIG. 2). Hereinafter, a relative weight of a functional requirement or a non-functional requirement is referred to as a requirement relative weight. The requirement relative weights are provided by the one or more users in input 106 (see FIG. 1). Each requirement relative weight indicates a relative importance of a functional requirement or non-functional requirement to the service being realized. The provided requirement relative weights add up to 100%.

In step 306, service integration realization system 104 (see FIG. 1) receives the provided requirement relative weights. Service integration realization system 104 (see FIG. 1) also stores (e.g., in data repository 110 of FIG. 1) the technology adoption preferences received in step 302, the technology preference relative weights received in step 304 and the requirement relative weights received in step 306. The calibration process of FIG. 3 ends at step 308.

Figure 4:
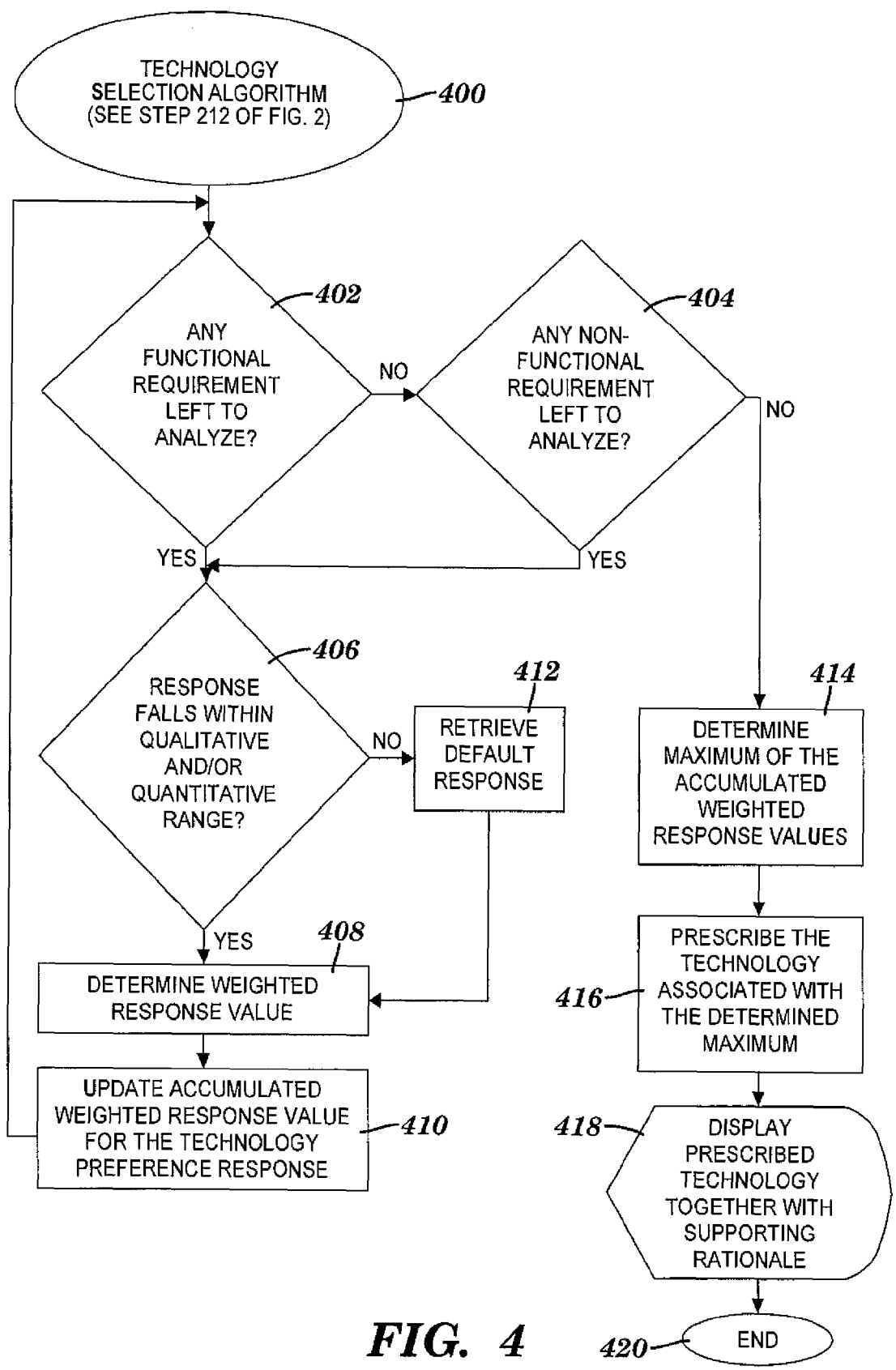
FIG. 4 is a flow diagram of a computing technology selection algorithm employed by the process of FIG. 2, in accordance with embodiments of the present invention.

FIG. 4 is a flow diagram of a technology selection algorithm employed by the process of FIG. 2, in accordance with embodiments of the present invention. The technology selection algorithm starts at step 400 and is included in step 212 (see FIG. 2).

In inquiry step 402, service integration realization system 104 (see FIG. 1) determines whether or not there are any functional requirements that were received in step 204 (see FIG. 2) that are left to be analyzed by the technology selection algorithm. If inquiry step 402 determines that all of the aforementioned functional requirements have been analyzed by the technology selection algorithm (i.e., the No branch of step 402), then in inquiry step 404, service integration realization system 104 (see FIG. 1) determines whether or not there are any non-functional requirements that were received in step 204 (see FIG. 2) that are left to be analyzed by the technology selection algorithm. If inquiry step 404 determines that there is a non-functional requirement that is left to be analyzed (i.e., there is a non-analyzed non-functional requirement) (i.e., the Yes branch of step 404), then in step 406, service integration realization system 104 (see FIG. 1) analyzes the response that is received in step 210 (see FIG. 2) and that is associated with the non-analyzed non-functional requirement. Further, if inquiry step 402 determines that there is a functional requirement that is left to be analyzed (i.e., there is a non-analyzed functional requirement) (i.e., the Yes branch of step 402), then in step 406, service integration realization system 104 (see FIG. 1) analyzes the response that is received in step 210 (see FIG. 2) and that is associated with the non-analyzed functional requirement.

If the analysis by service integration realization system 104 (see FIG. 1) in inquiry step 406 determines that the response being analyzed is included within a pre-defined range of qualitative and/or quantitative responses, then in step 408, service integration realization system 104 (see FIG. 1) determines a weighted response value that is associated with (1) the response that is analyzed in step 406 and (2) the functional or non-functional requirement associated with the response that is analyzed in step 406.

In one embodiment, step 408 utilizes equation (1) (see below) to determine a weighted response value.

$$wrv_{i,j} = rw_j * tw_i \quad (1)$$

In equation (1), $wrv_{i,j}$ is the weighted response value being determined in step 408 that is associated with an i-th technology preference response value included in the pre-defined set of technology preference responses stored in data repository 110 (see FIG. 1) and a j-th requirement of the set of functional requirements and non-functional requirements received in step 204 (see FIG. 2), where the j-th requirement is a functional or non-functional requirement for which the response analyzed in step 406 is provided in step 208 (see FIG. 2); $rw_j$ is a j-th requirement relative weight (i.e., a relative weight of the aforementioned j-th requirement); and $tw_i$ is an i-th technology preference relative weight associated with the response analyzed in step 406.

In step 410, service integration realization system 104 (see FIG. 1) updates an accumulated weighted response value that is associated with the technology preference response analyzed in step 406. Because of the aforementioned association with the response analyzed in step 406, the accumulated weighted response value updated in step 410 is also associated with the technology that corresponds to the response analyzed in step 406. Step 410 updates (e.g., increments) the accumulated weighted response value with the weighted response value determined in step 408. Following step 410, the algorithm of FIG. 4 repeats starting at step 402.

In one embodiment, step 410 utilizes equation (2) (see below) to update the accumulated weighted response value associated with the response being analyzed by step 406.

$$awrv_i = awrv_i + wrv_{i,j} \quad (2)$$

In equation (2), $awrv_i$ is the accumulated weighted response value associated with an i-th technology preference response value and $wrv_{i,j}$ is defined above in the discussion relative to equation (1).

The accumulated weighted response value updated in step 410 is included in a set of accumulated weighted response values. The accumulated weighted response values are associated, in a one-to-one correspondence, with the technology preference responses of the pre-defined set of technology preference responses. Each accumulated weighted response value accumulates a running total of the weighted response values that are determined in step 408 and that are associated with one of the responses of the pre-defined set of technology preference responses. In one embodiment, the accumulated weighted response values are initialized (e.g., to a value of zero) in a step (not shown) that precedes step 402.

Returning to inquiry step 406, if the response being analyzed is not included within a pre-defined qualitative and/or quantitative range, then in step 412, service integration realization system 104 (see FIG. 1) retrieves a default response (e.g., from data repository 110) and determines a weighted response value in step 408 for the retrieved default response.

Returning to inquiry step 404, if all non-functional requirements have been analyzed by the technology selection algorithm, then in step 414, service integration realization system 104 (see FIG. 1) determines the maximum of the accumulated weighted response values that are included in the aforementioned set of accumulated weighted response values.

In step 416, service integration realization system 104 (see FIG. 1) identifies the technology associated with the maximum determined in step 414 and prescribes the identified technology as the technology to be utilized to realize the service. In step 418, service integration realization system 104 (see FIG. 1) displays output report 108 (see FIG. 1) that includes the prescribed technology and includes rationale that supports the prescription of the technology. The technology selection algorithm ends at step 420.

Figure 5:
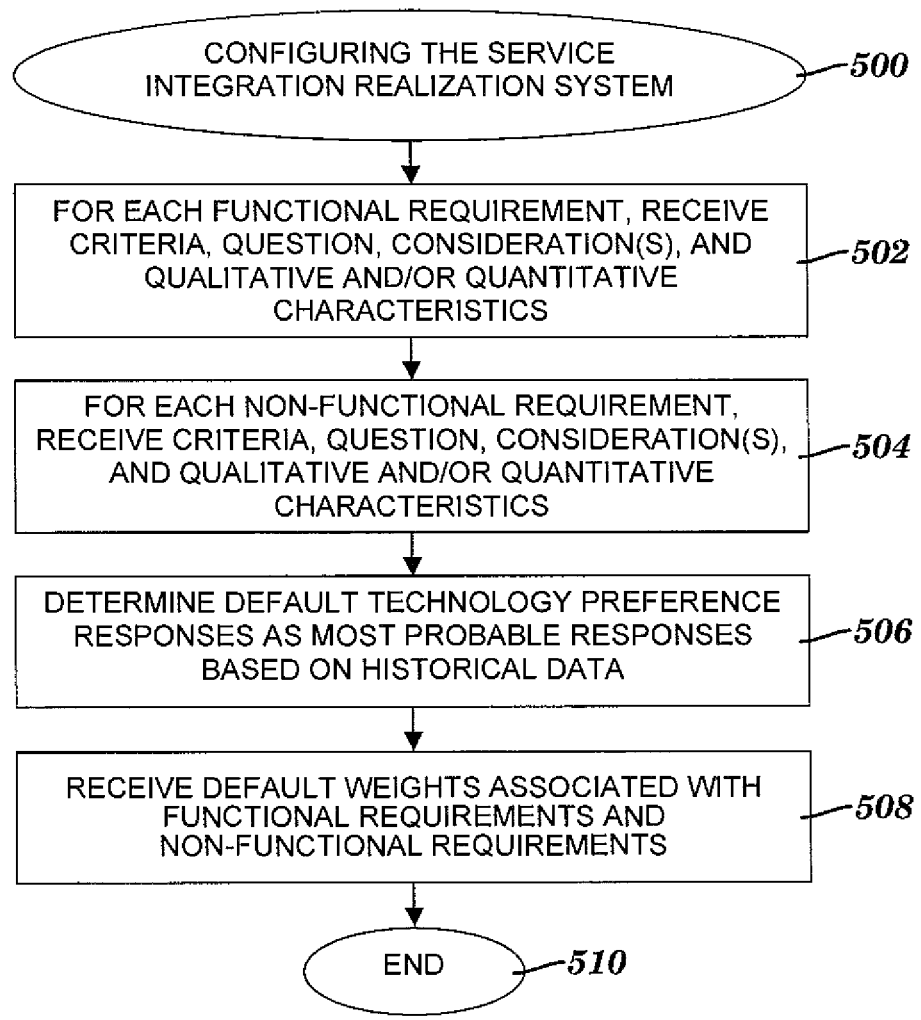
FIG. 5 is a flow diagram of a service integration realization system configuration process implemented by the system of FIG. 1, in accordance with embodiments of the present invention.

FIG. 5 is a flow diagram of a service integration realization system configuration process implemented by the system of FIG. 1, in accordance with embodiments of the present invention. The configuration process of FIG. 5 begins at step 500 and precedes the steps of the process of FIG. 2.

In step 502, service integration realization system 104 (see FIG. 1) receives, for each functional requirement included in the pre-defined list of functional requirements, a criterion associated with the functional requirement, a question that is to be answered by a user of system 100 (see FIG. 1), one or more considerations that are to be considered by the user who is answering the aforementioned question, and the set of qualitative and/or quantitative characteristics that is displayed in step 208 (see FIG. 2) relative to the functional requirement. The user answers the question associated with the functional requirement to facilitate providing the response in step 208 (see FIG. 1) that is related to the functional requirement. For each of the aforementioned functional requirements, service integration realization system 104 (see FIG. 1) stores the criterion, question, consideration(s) and set of characteristics in data repository 110, together with an identifier that uniquely identifies the functional requirement.

In step 504, service integration realization system 104 (see FIG. 1) receives, for each non-functional requirement included in the pre-defined list of non-functional requirements, a criterion associated with the non-functional requirement, a question that is to be answered by a user of system 100 (see FIG. 1), one or more considerations that are to be considered by the user who is answering the aforementioned question, and the set of qualitative and/or quantitative characteristics that is displayed in step 208 (see FIG. 2) relative to the non-functional requirement. The user answers the question associated with the non-functional requirement to facilitate providing the response in step 208 (see FIG. 1) that is related to the non-functional requirement. For each of the aforementioned non-functional requirements, service integration realization system 104 (see FIG. 1) stores the criterion, question, consideration(s) and set of characteristics in data repository 110, together with an identifier that uniquely identifies the non-functional requirement.

In step 506, service integration realization system 104 (see FIG. 1) determines the default technology preference responses that are retrieved in step 412 (see FIG. 4) and that are associated, in a one-to-one correspondence, with the functional and non-functional requirements received in step 204. A default technology preference response is determined in step 506 by identifying the most probable response for a functional or non-functional requirement based on data (e.g., counts or percentages) relative to response values that were previously provided for the functional or non-functional requirement. Service integration realization system 104 (see FIG. 1) retrieves the data relative to the previously provided response values from the historical database included in data repository 110 (see FIG. 1). Service integration realization system 104 (see FIG. 1) uses a default response determined in step 506 if no response is provided by a user in step 208 (see FIG. 2) for the associated functional or non-functional requirement.

In step 508, service integration realization system 104 (see FIG. 1) receives default values for the relative weights associated with the functional and non-functional requirements and stores the default values in data repository 110 (see FIG. 1). The process of FIG. 5 ends at step 510.

Example

Output report 108 (see FIG. 1) includes, for example, a report whose excerpts are depicted in FIGS. 6A-6E. FIG. 6A depicts a report excerpt 600 that includes a first set of functional requirement information associated with an exemplary service integration resulting from the process of FIG. 2, in accordance with embodiments of the present invention. Report excerpt 600 in FIG. 6A includes identifiers (ID) 602, criteria 603, questions 604, considerations 605 and criteria weights 606. Identifiers 602 uniquely identify the functional requirements identified in step 204 (see FIG. 2) (i.e., the identified functional requirements). For example, the first functional requirement identified in step 204 (see FIG. 1) is indicated by the unique identifier FR01 in column 602 of report excerpt 600.

Each criterion (a.k.a. service requirement) in criteria 603 is uniquely associated with an identified functional requirement. Each criterion in criteria 603 is satisfied by characteristics that are indicated by a response received in step 210 (see FIG. 2). Each question in questions 604 is uniquely associated with a criterion in criteria 603 and a response that is provided for the question indicates the characteristics that satisfy the associated criterion. Each consideration in considerations 605 is uniquely associated with a question included in questions 604 and is a statement that is considered by the user(s) who provide the response to the associated question. Identifiers 602, criteria 603, questions 604 and considerations 605 are initially received by service integration realization system 104 (see FIG. 1) in step 502 (see FIG. 5). Each criteria weight in criteria weights 606 is a relative weight of an identified functional requirement, where the relative weight is received in step 306 of FIG. 3.

FIG. 6B depicts a report excerpt 610 that includes a second set of functional requirement information associated with an exemplary service integration resulting from the process of FIG. 2, in accordance with embodiments of the present invention. Report excerpt 610 includes identifiers 602 and criteria 603, which are described above relative to FIG. 6A. Report excerpt 610 also includes technology preference/characteristics columns 611, 612, 613, 614, 615 and 616. Furthermore, report excerpt 610 includes responses and recommendations 617. Taken together, excerpt 600 (see FIG. 6A) and entries in columns 611-617 of excerpt 610 represent complete rows of a table included in output report 108 (see FIG. 1).

The heading of each column 611-616 indicates a technology included in the pre-defined list of technologies and a numeric indicator that uniquely identifies: (1) the technology and (2) a characteristic in each set of characteristics, as described below. Descriptions of the technologies indicated by the headings of columns 611-616 are presented below:

1. SOAP/HTTP (SOAP over HTTP): SOAP/HTTP is the SOAP message-exchange protocol using the application layer protocol HTTP as a transport protocol. SOAP is a simple object protocol for exchanging Extensible Markup Language (XML)-based messages over computer networks. HTTP is the Hypertext Transfer Protocol, which is a request/response communications protocol used to transfer or convey information between clients and servers.

2. JMS/Broker: Java® Message Service (JMS) is a Java® message-oriented middleware application programming interface (API) for sending messages between two or more clients. Broker indicates that a middleware broker is brokering the JMS messages.

3. ETL: Extract Transform and Load (ETL) is a process that involves extracting data from one or more outside sources (e.g. a first database), transforming the extracted data to fit business or technical needs of an end target (e.g., a second database) via an application of rules and/or functions, and loading the transformed data into the end target.

4. FTP: File Transfer Protocol (FTP) is a protocol used to transfer data from one computer to another computer over the Internet, or through a network.

5. RMI/IIOP (RMI over IIOP): Java® Remote Method Invocation (RMI) is a Java® API for performing the object equivalent of remote procedure calls. Internet Inter-ORB Protocol (IIOP) is a protocol for connecting and ensuring interoperability between Common Object Request Broker Architecture (CORBA) products from different vendors. RMI over IIOP® delivers CORBA distributed computing capabilities to the Java® 2 platform.

6. Socket is a low level Transmission Control Protocol/Internet Protocol (TCP/IP) that allows communication between two computing systems.

Below the heading of each of the columns 611-616 are characteristics associated with criteria (see column 603 of FIG. 6A) that is associated with the identified functional requirements, where the characteristics are initially received in step 502 (see FIG. 5), are displayed in step 208 (see FIG. 2), and are associated with the numeric indicator in the column heading.

Each set of characteristics along a row in report excerpt 610 include the characteristics that can satisfy the associated criterion (see column 603 of FIG. 6A) via a response received in step 210 (see FIG. 2). The response received in step 210 (see FIG. 2) is a numeral that (1) indicates a characteristic included in the set of characteristics, (2) matches one of the numeric indicators in the headings of columns 611-616 described above, and (3) is included in column 617 in the row that includes the set of characteristics. The characteristic indicated by the numeral is a response to the associated question. The associated question is in column 604 (see FIG. 6A) and is in the row that includes the set of characteristics.

For example, the first row of data in FIGS. 6A-6B indicates that functional requirement FR01 is associated with a Frequency criterion and the question associated with the Frequency criterion is: "How frequently will this service be accessed?" Considerations for a user who is responding to the question "How frequently will this service be accessed?" are stated as: "Some services are not frequently accessed since their function or information does not change very often or is needed only occasionally (e.g., sales forecast)."

After reviewing six characteristics displayed in step 208 (see FIG. 2) (i.e., the entries in columns 611-616 in FIG. 6B that correspond FR01), a user provides a response of 2, which is received in step 210 (see FIG. 2). The received response of 2 is shown in the first data entry of column 617 of FIG. 6B. The response of 2 indicates the JMS/Broker technology, which is also listed in the first data entry of column 617. The association between the numeral 2 and the JMS/Broker technology is also shown in the heading of column 612 of FIG. 6B. Because of the aforementioned association between the response of 2 and column 612 of FIG. 6B, the response of 2 also indicates the characteristic in the data entry of column 612 that corresponds to FR01. That is, the response of 2 indicates that "Several times an hour or minute" in the first data entry in column 612 (see FIG. 6B) is the response to the aforementioned question, "How frequently will this service be accessed?"

FIG. 6C depicts a report excerpt 620 that includes a first set of non-functional requirement information associated with an exemplary service integration resulting from the process of FIG. 2, in accordance with embodiments of the present invention. Report excerpt 620 in FIG. 6C includes identifiers (ID) 622, criteria 623, questions 624, considerations 625 and criteria weights 626. Identifiers 622 uniquely identify the non-functional requirements identified in step 204 (see FIG. 2) (i.e., the identified non-functional requirements). For example, the first non-functional requirement identified in step 204 (see FIG. 1) is indicated by the unique identifier NFR01 in ID column 622 of report excerpt 620.

Each criterion (a.k.a. service requirement) in criteria 623 is uniquely associated with an identified non-functional requirement. Each criterion in criteria 623 is satisfied by a characteristic that is indicated by a response received in step 210 (see FIG. 2). Each question in questions 624 is uniquely associated with a criterion in criteria 623 and a response that is provided for the question indicates the characteristics that satisfy the associated criterion. Each consideration in considerations 625 is uniquely associated with a question included in questions 624 and is a statement that is considered by the user(s) who provide the response to the associated question. Identifiers 622, criteria 623, questions 624 and considerations 625 are initially received by service integration realization system 104 (see FIG. 1) in step 504 (see FIG. 5). Each criteria weight in criteria weights 626 is a relative weight of an identified non-functional requirement, where the relative weight is received in step 306 of FIG. 3.

FIG. 6D depicts a report excerpt 630 that includes a second set of non-functional requirement information associated with an exemplary service integration resulting from the process of FIG. 2, in accordance with embodiments of the present invention. Report excerpt 630 includes identifiers 622 and criteria 623, which are described above relative to FIG. 6C. Report excerpt 630 also includes technology preference/characteristics columns 631, 632, 633, 634, 635 and 636. Furthermore, report excerpt 630 includes responses and recommendations 637. Taken together, excerpt 620 (see FIG. 6C) and entries in columns 631-637 of excerpt 630 represent complete rows of a table included in output report 108 (see FIG. 1).

The heading of each column 631-636 includes a technology included in the pre-defined list of technologies and a numeric indicator that uniquely identifies the technology and a characteristic in each set of characteristics, as described below. Below the heading of each of the columns 631-636 are characteristics associated with criteria (see column 623 of FIG. 6C) that is associated with the identified non-functional requirements, where the characteristics are initially received in step 504 (see FIG. 5), are displayed in step 208 (see FIG. 2), and are associated with the numeric indicator in the column heading.

Each set of characteristics along a row in report excerpt 630 include the characteristics that can satisfy the associated criterion (see column 623 of FIG. 6C) via a response received in step 210 (see FIG. 2). The response received in step 210 (see FIG. 2) is a numeral that (1) indicates a characteristic included in the set of characteristics, (2) matches one of the numeric indicators in the headings of columns 631-636 described above, and (3) is included in column 637 in the row that includes the set of characteristics. The characteristic indicated by the numeral is a response to the associated question. The associated question is in column 624 (see FIG. 6C) and is in the row that includes the set of characteristics.

For example, the first row of data in FIGS. 6C-6D indicate that non-functional requirement NFR01 is associated with a Payload Size criterion and the question associated with the Payload Size criterion is: "What is the transaction payload size?". Considerations for a user who is responding to the question "What is the transaction payload size?" are stated as: "The size of each payload has an impact on the technology used. Some payloads need to accommodate multiple transactions while others can be on an individual transaction level."

After reviewing six characteristics displayed in step 208 (see FIG. 2) (i.e., the entries in columns 631-636 in FIG. 6D that correspond to NFR01), a user provides a response of 2, which is received in step 210 (see FIG. 2). The received response of 2 is shown in the first data entry of column 637 of FIG. 6D. The response of 2 indicates the JMS/Broker technology, which is also listed in the first data entry of column 637. The association between the numeral 2 and the JMS/Broker technology is also shown in the heading of column 632 of FIG. 6D. Because of the aforementioned association between the response of 2 and column 632 of FIG. 6D, the response of 2 also indicates the characteristic in the data entry of column 632 that corresponds to NFR01. That is, the response of 2 indicates that "Large payload capability. Optimized for 2-4 K. Practical upper limit is several MB/rqs" is the response to the aforementioned question, "What is the transaction payload size?"

FIG. 6E depicts a report excerpt 650 that includes calibration data received in the process of FIG. 3, accumulated weighted response values determined in the process of FIG. 4, and a technology prescribed in the process of FIG. 4, in accordance with embodiments of the present invention. The information in report excerpt 650 applies to the entire set of identified requirements in FIGS. 6A-6D—the identified functional requirements and the identified non-functional requirements.

The entries that are listed in the last row of report excerpt 650 indicate the technologies in the pre-defined list of technologies and are the same as the column headings in columns 611-616 of FIG. 6B and columns 631-636 of FIG. 6D.

The Yes (Y) and No (N) indicators of the Technology Adoption Preference row of report excerpt 650 are received by service integration realization system 104 (see FIG. 1) in step 302 of FIG. 3. The Y indicators indicate the technologies that are preferred for realizing the service and the N indicators indicate the technologies that are not preferred for realizing the service. For example, a client (e.g., company) who is requesting the service prefers using SOAP/HTTP to realize the service because the client already has trained personnel to support such a technology choice. An indication of the client's SOAP/HTTP preference is received by service integration realization system 104 (see FIG. 1). Furthermore, system 104 (see FIG. 1) includes a Y indicator in the Technology Adoption Preference row of excerpt 650, where the Y indicator corresponds to the SOAP/HTTP technology listed in the last row of excerpt 650.

Continuing the same example, the client prefers not to use the Socket technology to realize the service because the client lacks trained personnel to support such a technology choice. Therefore, system 104 (see FIG. 1) receives an indication of the client's non-preference for the Socket technology and includes an N indicator in the Technology Adoption Preference row of excerpt 650 so that the N indicator corresponds to the Socket technology. For each technology for which the technology adoption preference is indicated as Yes, a client (e.g., company) provides relative weights (i.e., the technology preference relative weights) that add up to 100%. The provided technology preference relative weights are received by service integration realization system 104 (see FIG. 1) in step 304 (see FIG. 3) and are included as the percentages in the row labeled Technology Preference Relative Weight in report excerpt 650.

Each percentage in the Responses by Criteria row of report excerpt 650 is calculated to indicate the percentage of responses that correspond to the associated technology in the last row of report excerpt 650. For example, the 34% and 43% values in the Responses by Criteria row indicate that 34% of the responses for the identified requirements (i.e., identified functional and identified non-functional requirements) indicate the SOAP/HTTP technology, while 43% of the responses indicate the JMS/Broker technology. The Responses by Criteria percentages are updated dynamically as additional responses are provided and will add up to 100% when valid responses for all identified requirements have been provided. In the example shown in report excerpt 650, the Responses by Criteria percentages do not add up to 100% because valid responses for all identified requirements have not yet been provided.

The values in the Accumulated Weighted Response Values row of report excerpt 650 are the accumulated weighted response values updated in step 410 (see FIG. 4). In step 414 of FIG. 4, 14% is determined to be the maximum accumulated weighted response value in excerpt 650. In step 416, the SOAP/HTTP technology in excerpt 650 is prescribed for realizing the service because the 14% maximum value determined in step 414 is associated with the SOAP/HTTP technology in the last row of excerpt 650. The prescribed technology of SOAP/HTTP is also included in the Prescribed Technology row of excerpt 650.

It should be noted that because of the weightings used in the equations described above relative to FIG. 4, the technology associated with the highest Responses by Criteria percentage is not necessarily the same as the prescribed technology. As one example, even though JMS/Broker is the technology corresponding to the maximum value in the Responses by Criteria row of excerpt 650, the prescribed technology is a different technology (i.e., SOAP/HTTP).

Computing System

Figure 7:
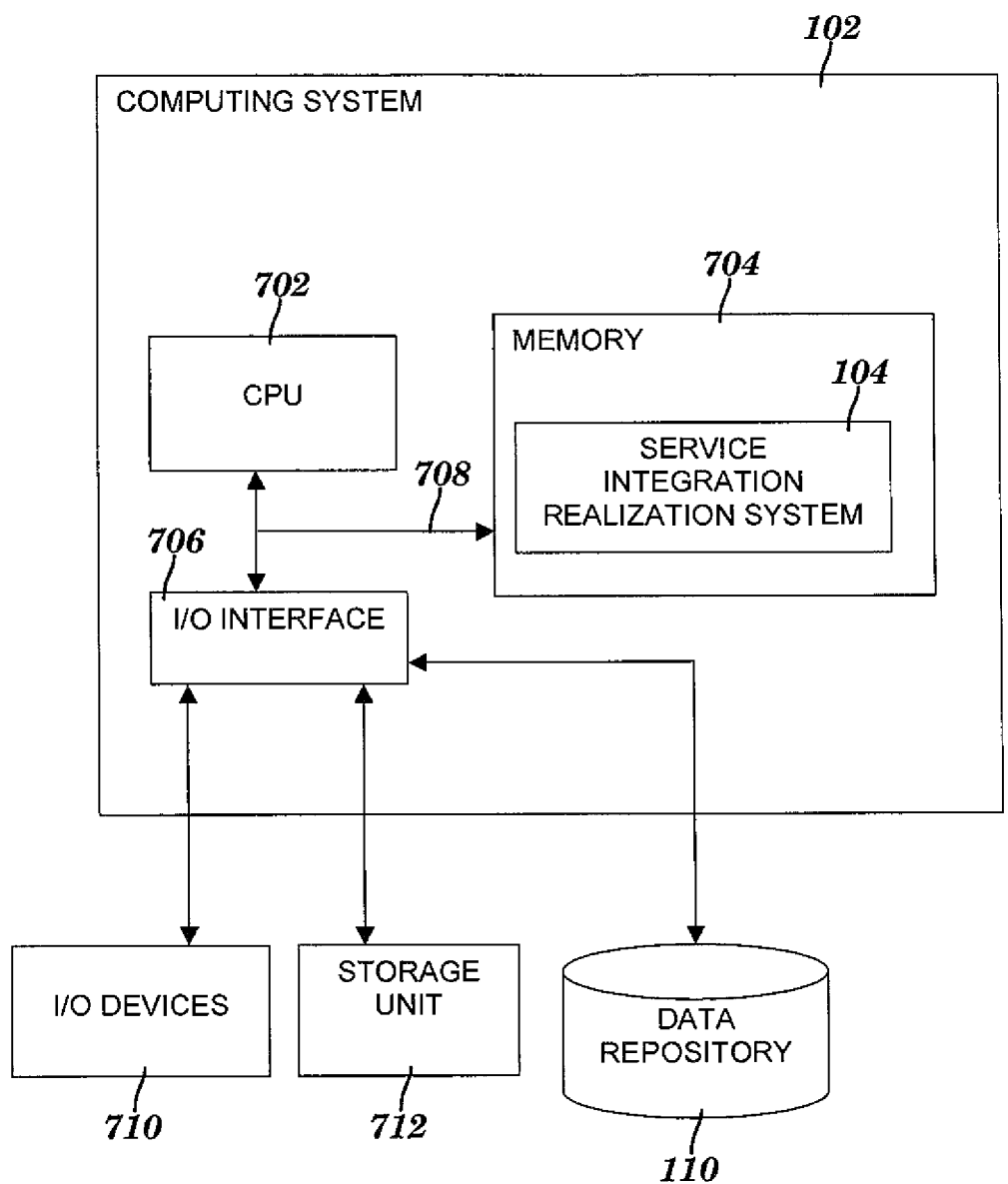
FIG. 7 is a block diagram of a computing system that is included in the system of FIG. 1 and that implements the process of FIG. 2, in accordance with embodiments of the present invention.

FIG. 7 is a block diagram of a computing system that is included in the system of FIG. 1 and that implements the process of FIG. 2, in accordance with embodiments of the present invention. Computing system 102 generally comprises a central processing unit (CPU) 702, a memory 704, an input/output (I/O) interface 706, a bus 708, I/O devices 710, a storage unit 712 and a data repository 110. CPU 702 performs computation and control functions of computing system 102. CPU 702 may comprise a single processing unit, or be distributed across one or more processing units in one or more locations (e.g., on a client and server).

Memory 704 may comprise any known type of data storage and/or transmission media, including bulk storage, magnetic media, optical media, random access memory (RAM), read-only memory (ROM), a data cache, a data object, etc. Cache memory elements of memory 704 provide temporary storage of at least some program code in order to reduce the number of times code must be retrieved from bulk storage during execution. Storage unit 712 is, for example, a magnetic disk drive or an optical disk drive that stores data. Moreover, similar to CPU 702, memory 704 may reside at a single physical location, comprising one or more types of data storage, or be distributed across a plurality of physical systems in various forms. Further, memory 704 can include data distributed across, for example, a LAN, WAN or storage area network (SAN) (not shown).

I/O interface 706 comprises any system for exchanging information to or from an external source. I/O devices 710 comprise any known type of external device, including a display monitor, keyboard, mouse, printer, speakers, handheld device, printer, facsimile, etc. Bus 708 provides a communication link between each of the components in computing system 102, and may comprise any type of transmission link, including electrical, optical, wireless, etc.

I/O interface 706 also allows computing system 102 to store and retrieve information (e.g., program instructions or data) from an auxiliary storage device (e.g., storage unit 712). The auxiliary storage device may be a non-volatile storage device (e.g., a CD-ROM drive which receives a CD-ROM disk). Computing system 102 can store and retrieve information from other auxiliary storage devices (not shown), which can include a direct access storage device (DASD) (e.g., hard disk or floppy diskette), a magneto-optical disk drive, a tape drive, or a wireless communication device.

Memory 704 includes program code for service integration realization system 104. Further, memory 704 may include other systems not shown in FIG. 7, such as an operating system (e.g., Linux) that runs on CPU 702 and provides control of various components within and/or connected to computing system 102.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code 104 for use by or in connection with a computing system 102 or any instruction execution system to provide and facilitate the capabilities of the present invention. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, RAM 704, ROM, a rigid magnetic disk and an optical disk. Current examples of optical disks include compact disk-read-only memory (CD-ROM), compact disk-read/write (CD-R/W) and DVD.

Any of the components of the present invention can be deployed, managed, serviced, etc. by a service provider that offers to deploy or integrate computing infrastructure with respect to the method of selecting a technology to implement a service integration. Thus, the present invention discloses a process for supporting computer infrastructure, comprising integrating, hosting, maintaining and deploying computer-readable code into a computing system (e.g., computing system 102), wherein the code in combination with the computing system is capable of performing a method of selecting a technology to implement a service integration.

In another embodiment, the invention provides a business method that performs the process steps of the invention on a subscription, advertising and/or fee basis. That is, a service provider, such as a Solution Integrator, can offer to create, maintain, support, etc. a method of selecting a technology to implement a service integration. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered a part of the present invention as recited in the appended claims.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The invention claimed is:

1. A method of prescribing a first software architecture to implement an integration of a plurality of services, the method comprising the steps of:
   a computer determining first products resulting from multiplying a first weight of a first software architecture by weights of first requirements satisfied by a first set of responses associated with the first software architecture;
   the computer determining second products resulting from multiplying a second weight of a second software architecture by weights of second requirements satisfied by a second set of responses associated with the second software architecture, the first and second requirements including functional requirements of a service included in the plurality of services and further including non-functional requirements of the service;
   the computer determining a first summation by summing the first products;
   the computer determining a second summation by summing the second products;
   the computer determining the first summation is greater than the second summation;
   based on the first summation of the first products resulting from multiplying the first weight of the first software architecture by the weights of the first requirements satisfied by the first set of responses associated with the first software architecture being greater than the second summation of the second products resulting from multiplying the second weight of the second software architecture by the weights of the second requirements satisfied by the second set of responses associated with the second software architecture, the computer selecting and prescribing the first software architecture instead of the second software architecture to realize the service in an implementation of the integration of the plurality of services; and
   the computer estimating a work effort required to utilize the prescribed first software architecture to realize the service, wherein the step of estimating the work effort comprises:
      the computer determining a complexity rating of the service based on complexity factors;
      based in part on the complexity rating, the computer generating a bottom-up estimate of the work effort;
      the computer developing a Full Time Equivalent (FTE) model for the integration of the plurality of services;
      based on the FTE model, the computer generating a top-down estimate of the work effort; and based on the bottom-up and top-down estimates, the computer generating a final estimate of the work effort.

2. The method of claim 1, wherein the step of generating the bottom-up estimate of the work effort is based in part on the prescribed first software architecture.

3. The method of claim 1, wherein the step of developing the FTE model includes developing the FTE model as a time-phased top-down FTE model for the integration of the plurality of services.

4. The method of claim 1, wherein the step of developing the FTE model is based on a timeline for the implementation of the integration of the plurality of services.

5. A computer system comprising:
   a central processing unit (CPU);
   a memory coupled to the CPU;
   a computer-readable, tangible storage device coupled to the CPU, the storage device including instructions that when executed by the CPU via the memory implement a method of prescribing a first software architecture to implement an integration of a plurality of services, the method comprising the steps of:
      the computer system determining first products resulting from multiplying a first weight of a first software architecture by weights of first requirements satisfied by a first set of responses associated with the first software architecture;
      the computer system determining second products resulting from multiplying a second weight of a second software architecture by weights of second requirements satisfied by a second set of responses associated with the second software architecture, the first and second requirements including functional requirements of a service included in the plurality of services and further including non-functional requirements of the service;
      the computer system determining a first summation by summing the first products;
      the computer system determining a second summation by summing the second products;
      the computer system determining the first summation is greater than the second summation;
      based on the first summation of the first products resulting from multiplying the first weight of the first software architecture by the weights of the first requirements satisfied by the first set of responses associated with the first software architecture being greater than the second summation of the second products resulting from multiplying the second weight of the second software architecture by the weights of the second requirements satisfied by the second set of responses associated with the second software architecture, the computer system selecting and prescribing the first software architecture instead of the second software architecture to realize the service in an implementation of the integration of the plurality of services; and
      the computer system estimating a work effort required to utilize the prescribed first software architecture to realize the service, wherein the step of estimating the work effort comprises:
         the computer system determining a complexity rating of the service based on complexity factors;
         based in part on the complexity rating, the computer system generating a bottom-up estimate of the work effort;
         the computer system developing a Full Time Equivalent (FTE) model for the integration of the plurality of services;
         based on the FTE model, the computer system generating a top-down estimate of the work effort; and
         based on the bottom-up and top-down estimates, the computer system generating a final estimate of the work effort.

6. The computer system of claim 5, wherein the step of generating the bottom-up estimate of the work effort is based in part on the prescribed first software architecture.

7. The computer system of claim 5, wherein the step of developing the FTE model includes developing the FTE model as a time-phased top-down FTE model for the integration of the plurality of services.

8. The computer system of claim 5, wherein the step of developing the FTE model is based on a timeline for the implementation of the integration of the plurality of services.

9. A method of prescribing a software architecture to implement an integration of a plurality of services, the method comprising the steps of:
   a computer receiving a set of requirements for a service included in the plurality of services, wherein the set of requirements includes a plurality of functional requirements and a plurality of non-functional requirements;
   the computer receiving software architecture preference relative weights for relatively weighting a set of software architectures consisting of (1) a first architecture that employs a simple object protocol to exchange Extensible Markup Language-based messages over computer networks, the simple object protocol using Hypertext Transfer Protocol (HTTP) as a transport protocol, (2) a second architecture that employs (i) a Java message-oriented middleware application programming interface (API) to send messages between clients and (ii) a middleware broker that brokers the messages, (3) a third architecture that employs an extract transform and load (ETL) process to extract data from a source, transform the extracted data to fit business or technical needs of a target via an application of rules and functions, and load the transformed data into the target, (4) a fourth architecture that employs a File Transfer Protocol (FTP) to transfer data from one computer to another computer over the Internet, or through a network, (5) a fifth architecture that employs (i) Java Remote Method Invocation (RMI) to perform an object equivalent of remote procedure calls, and (ii) a protocol to connect and ensure interoperability between Common Object Request Broker Architecture (CORBA) products from different vendors, and (6) a sixth architecture that employs a low level Transmission Control Protocol/Internet Protocol (TCP/IP) to allow communication between two computing systems;
   the computer receiving a plurality of requirement relative weights for relatively weighting the set of requirements;
   the computer receiving a plurality of responses, wherein the responses are associated with the requirements and with the requirement relative weights in a one-to-one correspondence, wherein the responses are associated with the software architecture preference relative weights and with six indicators in a many-to-one correspondence, wherein the six indicators indicate the first, second, third, fourth, fifth and sixth software architectures, respectively, and wherein the plurality of responses indicates a plurality of characteristics that satisfy the set of requirements; and the computer prescribing the software architecture to build the service within an implementation of the integration of the plurality of services, wherein the step of prescribing includes:
- the computer identifying a response included in the plurality of responses as being included within a predefined range of responses;
- the computer determining a weighted response value $wrv_{i,j}$ as $rw_j * tw_i$, wherein $wrv_{i,j}$ is associated with an i-th indicator of the six indicators and with a j-th requirement of the set of requirements, wherein the j-th requirement is associated with the response, wherein the $rw_j$ is a j-th requirement relative weight of the plurality of requirement relative weights, and wherein the $tw_i$ is an i-th software architecture preference relative weight of the plurality of software architecture relative weights;
- in response to the step of determining the weighted response value $wrv_{i,j}$, the computer updating an accumulated weighted response value $awrv_i$ by adding the $wrv_{i,j}$ to the $awrv_i$, wherein the $awrv_i$ is associated with the i-th indicator;
- the computer determining a maximum value $awrv_k$ of a plurality of accumulated weighted response values $awrv_1, \ldots, awrv_n$, wherein each accumulated weighted response value included in the plurality of accumulated weighted response values is a result of the step of updating the $awrv_i$, and wherein the maximum value $awrv_k$ is associated with a k-th indicator of the six indicators; and
- based on the software architecture being associated with the k-th indicator and with the maximum value $awrv_k$, the computer selecting the software architecture from the set of software architectures consisting of the first, second, third, fourth, fifth and sixth architectures.

10. The method of claim 9, further comprising the step of the computer displaying an output report which includes the prescribed software architecture.

11. The method of claim 9, further comprising the step of the computer displaying a set of characteristics included in the plurality of characteristics for each requirement included in the set of requirements.

12. The method of claim 9, further comprising the step of the computer determining an estimate of an effort associated with utilizing the prescribed software architecture to realize the service within the implementation of the integration of the plurality of services.

13. The method of claim 9, further comprising the step of the computer receiving, for a requirement included in the set of requirements, a criterion, a set of characteristics included in the plurality of characteristics, a question, and one or more considerations, wherein the step of receiving the plurality of responses includes receiving a response included in the plurality of responses from a user of the computer, wherein the response is a characteristic included in the set of characteristics, and wherein the characteristic is an answer to the question, wherein the answer is provided by the user in response to considering the one or more considerations.

14. The method of claim 9, further comprising the steps of:
- prior to the step of receiving the plurality of responses, the computer receiving a prior set of responses associated with the set of requirements;
- the computer storing the prior set of responses in a historical database;
- the computer determining likelihoods of the six indicators, the likelihoods being based on the prior set of responses stored in the historical database, and each likelihood of an indicator included in the six indicators is a likelihood of a receipt, by the computer, of a response associated with the indicator, the response included in the plurality of responses; and
- the computer identifying a default response associated with a requirement included in the set of requirements, wherein the step of identifying the default response includes determining a maximum likelihood of the likelihoods, wherein the maximum likelihood is associated with a default indicator included in the six indicators, and wherein the default response is associated with the default indicator.

15. A computer system comprising:
a central processing unit (CPU);
a memory coupled to the CPU;
a computer-readable, tangible storage device coupled to the CPU, the storage device including instructions that when executed by the CPU via the memory implement a method of prescribing a software architecture to implement an integration of a plurality of services, the method comprising the steps of:
- the computer system receiving a set of requirements for a service included in the plurality of services, wherein the set of requirements includes a plurality of functional requirements and a plurality of non-functional requirements;
- the computer system receiving software architecture preference relative weights for relatively weighting a set of software architectures consisting of (1) a first architecture that employs a simple object protocol to exchange Extensible Markup Language-based messages over computer system networks, the simple object protocol using Hypertext Transfer Protocol (HTTP) as a transport protocol, (2) a second architecture that employs (i) a Java message-oriented middleware application programming interface (API) to send messages between clients and (ii) a middleware broker that brokers the messages, (3) a third architecture that employs an extract transform and load (ETL) process to extract data from a source, transform the extracted data to fit business or technical needs of a target via an application of rules and functions, and load the transformed data into the target, (4) a fourth architecture that employs a File Transfer Protocol (FTP) to transfer data from one computer system to another computer system over the Internet, or through a network, (5) a fifth architecture that employs (i) Java Remote Method Invocation (RMI) to perform an object equivalent of remote procedure calls, and (ii) a protocol to connect and ensure interoperability between Common Object Request Broker Architecture (CORBA) products from different vendors, and (6) a sixth architecture that employs a low level Transmission Control Protocol/Internet Protocol (TCP/IP) to allow communication between two computing systems;
- the computer system receiving a plurality of requirement relative weights for relatively weighting the set of requirements;
- the computer system receiving a plurality of responses, wherein the responses are associated with the requirements and with the requirement relative weights in a one-to-one correspondence, wherein the responses are associated with the software architecture preference relative weights and with six indicators in a many-to-one correspondence, wherein the six indicators indicate the first, second, third, fourth, fifth and sixth software architectures, respectively, and wherein the plurality of responses indicates a plurality of characteristics that satisfy the set of requirements; and the computer system prescribing the software architecture to build the service within an implementation of the integration of the plurality of services, wherein the step of prescribing includes:

the computer system identifying a response included in the plurality of responses as being included within a pre-defined range of responses;

the computer system determining a weighted response value $wrv_{i,j}$ as $rw_j*tw_i$, wherein $wrv_{i,j}$ is associated with an i-th indicator of the six indicators and with a j-th requirement of the set of requirements, wherein the j-th requirement is associated with the response, wherein the $rw_j$ is a j-th requirement relative weight of the plurality of requirement relative weights, and wherein the $tw_i$ is an i-th software architecture preference relative weight of the plurality of software architecture relative weights;

in response to the step of determining the weighted response value $wrv_{i,j}$, the computer system updating an accumulated weighted response value $awrv_i$ by adding the $wrv_{i,j}$ to the $awrv_i$, wherein the $awrv_i$ is associated with the i-th indicator;

the computer system determining a maximum value $awrv_k$ of a plurality of accumulated weighted response values $awrv_1, \ldots, awrv_n$, wherein each accumulated weighted response value included in the plurality of accumulated weighted response values is a result of the step of updating the $awrv_i$, and wherein the maximum value $awrv_k$ is associated with a k-th indicator of the six indicators; and based on the software architecture being associated with the k-th indicator and with the maximum value $awrv_k$, the computer system selecting the software architecture from the set of software architectures consisting of the first, second, third, fourth, fifth and sixth architectures.

16. The computer system of claim 15, wherein the method further comprises the step of the computer system displaying an output report which includes the prescribed software architecture.

17. The computer system of claim 15, wherein the method further comprises the step of the computer system displaying a set of characteristics included in the plurality of characteristics for each requirement included in the set of requirements.

18. The computer system of claim 15, wherein the method further comprises the step of the computer system determining an estimate of an effort associated with utilizing the prescribed software architecture to realize the service within the implementation of the integration of the plurality of services.

19. The computer system of claim 15, wherein the method further comprises the step of the computer system receiving, for a requirement included in the set of requirements, a criterion, a set of characteristics included in the plurality of characteristics, a question, and one or more considerations, wherein the step of receiving the plurality of responses includes receiving a response included in the plurality of responses from a user of the computer system, wherein the response is a characteristic included in the set of characteristics, and wherein the characteristic is an answer to the question, wherein the answer is provided by the user in response to considering the one or more considerations.

20. The computer system of claim 15, wherein the method further comprises the steps of:

prior to the step of receiving the plurality of responses, the computer system receiving a prior set of responses associated with the set of requirements;

the computer system storing the prior set of responses in a historical database;

the computer system determining likelihoods of the six indicators, the likelihoods being based on the prior set of responses stored in the historical database, and each likelihood of an indicator included in the six indicators is a likelihood of a receipt, by the computer system, of a response associated with the indicator, the response included in the plurality of responses; and the computer system identifying a default response associated with a requirement included in the set of requirements, wherein the step of identifying the default response includes determining a maximum likelihood of the likelihoods, wherein the maximum likelihood is associated with a default indicator included in the six indicators, and wherein the default response is associated with the default indicator.

\* \* \* \* \*